(12) United States Patent
Izzia et al.

(10) Patent No.: US 7,496,220 B2
(45) Date of Patent: Feb. 24, 2009

(54) SPECTROSCOPIC MICROSCOPY WITH IMAGE-DRIVEN ANALYSIS

(75) Inventors: Federico Izzia, Middleton, WI (US); Kathleen J. Schulting, Oregon, WI (US); Alexander Grenov, Madison, WI (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 62 days.

(21) Appl. No.: 11/846,499

(22) Filed: Aug. 28, 2007

(65) Prior Publication Data

US 2008/0049220 A1 Feb. 28, 2008

Related U.S. Application Data

(60) Provisional application No. 60/840,882, filed on Aug. 28, 2006.

(51) Int. Cl.
*G06K 9/00* (2006.01)
(52) U.S. Cl. ........................................ 382/128; 382/173
(58) Field of Classification Search ......... 382/128–133, 382/173, 164; 250/339.05, 339.07, 339.12, 250/349, 353, 311, 461.2, 347; 356/303, 356/307, 456, 326, 301; 359/305, 308, 39, 359/285; 702/27–32, 194
See application file for complete search history.

(56) References Cited

U.S. PATENT DOCUMENTS

| | | | |
|---|---|---|---|
| 6,121,616 A * | 9/2000 | Trigg | 250/339.07 |
| 6,584,413 B1 | 6/2003 | Keenan et al. | |
| 6,675,106 B1 | 1/2004 | Keenan et al. | |
| 6,867,899 B2 * | 3/2005 | Knebel | 359/305 |
| 7,324,272 B1 * | 1/2008 | Deck | 359/385 |

OTHER PUBLICATIONS

Nishikida, K., "Spatial Resolution in Infrared Microscopy and Imaging," Application Note: 50717, Thermo Electron Corp. (Madison), 5 pgs., (2006).
McCarthy, W., "Infrared Chemical Imaging: The Future of Fourier Transform IR Spectroscopy," Photonics Spectra, Laurin Publishing, 4 pgs., (2004).
"Nicolet Continuum Infrared Microscope," Product Guide, Thermo Electron Corporation (Madison), 12 pgs., (2006).
Carl, R., "Limiting Diffraction in an Infrared Microscope," Technical Note—TN-9251, Nicolet Instruments Corporation (Madison), 2 pgs.
"Apertures," Product Guide, Thermo Fisher Scientific Inc., 1 pg., (2006).

* cited by examiner

*Primary Examiner*—Sherali Ishrat
(74) *Attorney, Agent, or Firm*—Charles B. Katz; Michael C. Staggs

(57) ABSTRACT

In a spectroscopic microscope, a video image of a specimen is analyzed to identify regions having different appearances, and thus presumptively different properties. The sizes and locations of the identified regions are then used to position the specimen to align each region with an aperture, and to set the aperture to a size appropriate for collecting a spectrum from the region in question. The spectra can then be analyzed to identify the substances present within each region of the specimen. Information on the identified substances can then be presented to the user along with the image of the specimen.

22 Claims, 4 Drawing Sheets

SPECTROSCOPIC MICROSCOPY WITH IMAGE-DRIVEN ANALYSIS

CROSS-REFERENCE TO RELATED APPLICATIONS

This application claims priority under 35 USC §119(e) to U.S. Provisional Patent Application 60/840,882 filed 28 Aug. 2006, the entirety of which is incorporated by reference herein.

FIELD OF THE INVENTION

This document concerns an invention relating generally to instruments for molecular spectrometry, and more specifically to spectroscopic microscopes.

BACKGROUND OF THE INVENTION

A molecular spectrometer (sometimes referred to as a spectroscope) is an instrument wherein a solid, liquid, or gaseous specimen is illuminated, often with non-visible light, such as light in the infrared region of the spectrum. The light from the specimen is then captured and analyzed to reveal information about the characteristics of the specimen. As an example, a specimen may be illuminated with infrared light having known intensity across a range of wavelengths, and the light transmitted and/or reflected by the specimen can then be captured for comparison to the illuminating light. Review of the captured spectra (i.e., light intensity vs. wavelength data) can then illustrate the wavelengths at which the illuminating light was absorbed by the specimen, which in turn can yield information about the chemical bonds present in the specimen, and thus its composition and other characteristics. To illustrate, libraries of spectra obtained from reference specimens of known composition are available, and by matching measured spectra versus these reference spectra, one can then determine the composition of the specimens from which the measured spectra were obtained.

Two common types of spectrometers are dispersive spectrometers and Fourier Transform (FT) spectrometers. In a dispersive spectrometer, a range of input light wavelengths are supplied to a specimen, and the output light from the specimen is received by a monochromator—a device which breaks the output light into its component wavelengths—with one or more detectors then measuring light intensity at these output wavelengths to generate the output spectrum. In an FT spectrometer, an interferometer is used to supply an interferogram—a time-varying mixture of several input light wavelengths—to a specimen, and one or more detectors measure the (time-varying) output light from the specimen. The various wavelengths of the output light can then be "unscrambled" using mathematical techniques, such as the Fourier Transform, to obtain the intensity of the output light at its component wavelengths and thereby generate the output spectrum.

Spectroscopic microscopes then usefully incorporate the ability to make spectroscopic measurements into an optical microscope. A user may therefore use a spectroscopic microscope to view an image of a region of interest on a specimen (usually in magnified form), and also to obtain spectroscopic data from one or more locations on the region of interest. In some instances, the spectroscopic measurements are automatically collected by capturing spectroscopic data along 1-dimensional rows of areas on the region of interest (i.e., at areas spaced along a line on the region of interest), and then repeatedly capturing spectroscopic data from adjacent 1-dimensional rows. In other words, the linear array of spectroscopically-sampled areas is stepped sideways to ultimately capture spectroscopic data over a 2-dimensional array of areas over the region of interest. As a result, the user can view an image of the region of interest, and can also review the spectra (and thus the composition) of the specimen at locations arrayed over the region of interest. A disadvantage of this approach is that each spectrum captured from an area will reflect the presence of whatever substances are present in the area (or at least the presence of those substances that are responsive to the incident light): for instance, if an area includes a particle of particular interest to the user, the captured spectrum from the area will reflect not just the spectrum of the particle, but will also tend to include contributions from the substances surrounding the particle within the area. The results of such measurements can still be useful—a user might still obtain information regarding the particle—but the results must be carefully interpreted.

As an alternative, users can manually collect spectroscopic readings from specimens. As an example, a user interested in obtaining data on the aforementioned particle might limit the field of view of the spectroscope's detector to only the area of the particle, as by masking the specimen such that only the particle is visible to the detector through an aperture. The spectrum captured from the aperture will then reflect only the contributions of the substances "seen" by the detector through the aperture. Masks with variable apertures are commonly used in spectroscopic microscopes, with the mask having two stacked pairs of plates, wherein the plates within each pair are coplanarly and adjacently situated with a space between their adjacent edges, and wherein the edges of the pairs are perpendicularly oriented with respect to each other. The plates within the pairs are then movable, usually in synchronized fashion, so that the space between the plate edges within each pair can be controlled. As a result, moving the plates within the pairs together, or moving them apart, generates an aperture with a square area of variable size. The disadvantage of the manual approach is that it is time-consuming and tedious—a user must move the mask to each particle of interest, and size the aperture so that only the desired area is imaged to the detector—and here too results must be carefully interpreted. For example, many beginning users of spectroscopic microscopes fail to appreciate that if a particle is in the nature of an occlusion within the specimen (e.g., as viewed, it is covered by an invisible layer of another substance), the spectrum captured from the particle will reflect not only the substance(s) present within the particle, but also those in the covering layer. Generating the correct settings for the microscope can also be a challenge, since many novice users fail to appreciate that the image of the specimen seen through the microscope's eyepiece(s) or camera may not correspond to the specimen as seen by the spectroscopic detector; thus, simply focusing on a particle or the like within a specimen may not limit the detector's field of view (and thus the spectroscopic readings) to the particle. Other subtleties also tend to hinder novice users, such as the issue that a smaller aperture setting (smaller detector field of view) tends to decrease the signal-to-noise ratio of the resulting spectral readings simply because the detector captures less light from a smaller field of view. Thus, smaller aperture settings usually require a longer exposure time (i.e., a higher detector data collection time), and/or the use of multiple exposures, which can then be combined (as by averaging them) to decrease the effects of noise.

All of the foregoing issues tend to pose obstacles to effective use of spectroscopic microscopes, particularly to new users. It would therefore be useful to have spectroscopic microscopes, and methods of operating spectroscopic microscopes, which allow for easier and more accurate collection of spectral data from particular areas within a region of interest on a specimen.

SUMMARY OF THE INVENTION

The invention involves methods and devices for spectroscopic microscopes which are intended to at least partially solve the aforementioned problems. To give the reader a basic understanding of some of the advantageous features of the invention, following is a brief summary of preferred versions of the methods and devices, with reference being made to the accompanying drawings to enhance the reader's understanding. Since this is merely a summary, it should be understood that more details regarding the preferred versions may be found in the Detailed Description set forth elsewhere in this document. The claims set forth at the end of this document then define the various versions of the invention in which exclusive rights are secured.

Looking to FIG. 1, an exemplary spectroscopic microscope 100 includes a specimen stage 102 whereupon a specimen may be received, with the specimen stage 102 preferably being motorized or otherwise being repositionable within the microscope 100. A light source 104 (such as an interferometer) provides light to the specimen via a first dichroic mirror 106 which passes the light and a second dichroic mirror 108 which reflects the light toward the specimen. The light is then focused at focusing optics 110 and transmitted through an aperture 112 in an aperture stage 114 before reaching the specimen. A detector 116 receives the resulting reflected/scattered light from the specimen back through the aperture 112 and the focusing optics 110, and as reflected from the first and second mirrors 106 and 108. A video camera 118 is also provided for capturing images of the specimen through the second dichroic mirror 108, focusing optics 110, and aperture stage 114. An eyepiece 120 for allowing direct user viewing of the specimen through these elements may also be provided.

The aperture stage 114 preferably has an aperture 112 which is adjustably resizable in at least two dimensions. This can be accomplished, for example, by defining the aperture 112 within a mask 122 having a first pair of adjacent masking plates 124 which are respaceable along one axis, and a second pair of adjacent masking plates 126 which are respaceable along a perpendicular axis, preferably independently of the spacing of the masking plates 124 of the first pair. The mask 122 therefore defines a rectangular aperture 112 with resizable dimensions bounded by the edges of the movable masking plates 124 and 126. The aperture stage 114 is also preferably rotatable into some desired orientation with respect to the specimen (e.g., so that the length of a rectangular aperture 112 may be aligned with the length of an area on the specimen), and if desired, it may also be movable so that its aperture 112 may be translated about the plane adjacent the specimen.

The foregoing arrangement may be used in the conventional manner discussed in the foregoing Background section of this document, with the spectroscopic microscope 100 allowing viewing of the specimen via the eyepiece 120 and/or camera 118 as spectra are captured by the detector 116 from one or more areas on the specimen (and with the aperture 112 limiting the spectral capture to a specific area of the specimen, if desired). However, the spectroscopic microscope 100 also preferably allows for the automated capture of spectra, and the presentation of spectral data to the user, in the following manner.

As the video camera 118 images the specimen (with such images being formed of a set of pixels representing the specimen), the image is supplied to a processor 128 wherein image analysis is performed. Sets of adjacent pixels having similar contrast are identified, with each such set defining an image region. As an example, looking to FIG. 2A for an exemplary video image 200 of a specimen—which could, for example, represent a sample of a drug having particles of active agents embedded within a binder—image regions having four different contrasts are shown: several (eleven) first image regions 200a formed of contiguous black pixels; several (three) second image regions 200b formed of contiguous dark grey pixels; several (four) third image regions 200c formed of contiguous light grey pixels; and a fourth image region 200d formed of contiguous white pixels (which might be regarded as a matrix image region, i.e., it represents the matrix in or upon which the other image regions are embedded or overlaid). The processor 128 may then calculate the size of the image regions 200a, 200b, 200c, and 200d (as by counting the number of pixels they contain), and may define a proposed aperture 112 for each of the image regions, as by generating the coordinates of a box which includes at least a portion of each image region. As an example, FIG. 2B illustrates possible proposed apertures 202, 204, 206, and 208 (such apertures being depicted by phantom/dashed-line representations of the edges of the masking plates 124 and 126), and these apertures will be discussed at greater length below.

The processor 128 may then move the specimen stage 102, and adjust the size and/or orientation of the aperture 112, such that the aperture 112 is aligned with at least a portion of a specimen region, i.e., an area on the specimen corresponding to one of the image regions 200a, 200b, 200c, and 200d. The field of view of the detector 116 on the specimen is limited to the area within the aperture 112, and thus the detector 116 may collect a region spectrum—the spectrum of the specimen region—through the aperture 112, and may supply it to the processor 128. The processor 128 may then resort to libraries of reference spectra (and/or to spectral identification algorithms) to identify one or more substances present in the region spectrum. The processor 128 may continue to move the specimen stage 102 and/or the aperture stage 114 to align other specimen regions with the appropriately-sized aperture 112, and to collect spectra therefrom, until spectra are collected for all of the specimen regions. Alternatively, spectra might only be collected for one specimen region per each type/class of image region 200a, 200b, 200c, and 200d, i.e., one spectrum might be collected per each set of image regions having a certain discrete contrast. In this case, a region spectrum collected from one of the specimen regions might be assumed to apply to all other specimen regions of the same type/class.

The processor 128 may then generate output identifying the substances for each of the specimen regions, i.e., naming the substances and/or providing other identifying information regarding their characteristics (such as crystallinity, phase, morphology, etc.). The identified substances can be output in connection with data such as the image 200 of the specimen; substance images of the specimen, i.e., the image of the specimen processed to emphasize or solely depict the image regions corresponding to each of the identified substances; the sizes of the specimen regions, with the sizes being at least partially defined by the number of pixels within the corresponding image regions; estimated quantities of each identified substance present in the image, with each estimated quantity being dependent on the sizes of the image regions containing the identified substance; the number of specimen regions containing the identified substance; and so forth. To illustrate, FIG. 3 provides an exemplary output 300 that might be provided for the specimen corresponding to the image of FIG. 2A, wherein the image 200 of the specimen is provided along with the substance images 300a, 300b, and 300c of the specimen; the spectra 302a, 302b, and 302c for each of these substances; and other quantities described above. For example, 300a provides the substance image for the image regions 200a of FIGS. 2A-2B, along with a spectrum 302a generated by averaging the region spectra of some or all of the corresponding specimen regions. The identity of the substance(s) within the corresponding specimen regions, and statistics generated from the substance images, are also provided.

Preferably, when the aperture 112 is adjusted to bound a specimen region for collection of spectra, the size of the aperture 112 will at least substantially correspond with the size of the specimen region so that the corresponding region spectrum will substantially correspond to only those substances within the specimen region. More specifically, it is preferred that the size of the aperture 112 be adjusted such that the boundaries of the aperture 112 rest entirely within the specimen region, whereby the region spectrum is defined solely by the specimen region. Such an arrangement is illustrated in FIG. 2B, wherein the specimen region for the image region 200b is imaged by the detector 116 within an aperture 202. However, in some cases—as where a specimen region is very small—this may set the aperture size too small for effective capture of region spectra, e.g., where the size of the aperture 112 is smaller than the diffraction-limited minimum, or where the size of the aperture 112 is such that spectral signal strength is undesirably noisy and/or where excessive additional exposures would be needed to attain suitable signal strength. In these cases, the aperture 112 may instead be set to bound an acceptable portion of the specimen region, plus some portion(s) of one or more adjacent specimen regions (as at the specimen region 200c, wherein the aperture 204 encompasses the specimen region 200c plus portions of the matrix specimen region 200d). Most preferably, the aperture 112 is sized to maximize the area of the specimen region within the boundaries of the aperture 112, while at the same time minimizing the area outside of the specimen region which rests within the boundaries of the aperture 112.

If the aperture stage 114 and/or specimen stage 102 accommodate rotational repositioning as well as translational repositioning, it is also useful if the processor 128 rotates the aperture 112 to align with each specimen region such that minimal area of the specimen region is outside the aperture 112, and/or so that minimal area outside the specimen region is within the aperture 112. An example of this arrangement is shown at the image region 200a in FIG. 2B, wherein the rectangular aperture 206 has been rotated to such an orientation that it closely bounds the corresponding specimen region (i.e., bounds the pixels within the image region 200a) while enclosing minimal area outside the specimen region (i.e., bounds minimal pixels within the image region 200d).

After a region spectrum is collected from a specimen region (such as the region 200c in FIG. 2B), it is then useful to move the specimen stage 102 so that the underlying or adjacent specimen region is within the aperture 112 (e.g., the specimen region of the matrix 200d). A matrix spectrum of the matrix specimen region can then be collected through the aperture 112, preferably while maintaining the same aperture size as that used for the specimen region (as illustrated, for example, by the aperture 204b in FIG. 2B). The matrix spectrum collected from aperture 204b may then be subtracted from the region spectrum collected from aperture 204. Subtracting the matrix spectrum from the region spectrum will yield a corrected region spectrum which should at least substantially represent only the substance(s) of the specimen region, thereby making it easier to identify these substances by use of reference libraries or the like.

FIG. 4 then schematically illustrates a particularly preferred image-based spectroscopy method which can be used instead of or in addition to the methods discussed above. A specimen image 400 from the video camera 118 is shown, with the specimen here being, for example, a cross-section of a thin film having three layers with distinct contrasts. These layers are visible as a first image region 400a, a second image region 400b, and a third image region 400c, along with a surrounding/underlying matrix region 400d. The successive representations (A)-(E) of the specimen image 400 then illustrate an exemplary aperture 402, one which is the minimum size for successful spectral capture, but which is too large to solely bound a specimen region which fits entirely within any of regions 400a, 400b, and 400c (i.e., regardless of the placement of the aperture 402, it will have within its boundaries portions of the specimen corresponding to two or more of the image regions 400a, 400b, and 400c). As illustrated by the successive representations (A)-(E), the aperture may be indexed to different locations across the specimen, with a spectrum being collected from each location. To illustrate, at (A), the aperture 402 captures a spectrum (shown at right) of the matrix region 400d (with the spectral peak of region 400d being present at d); at (B), the aperture 402 captures a spectrum of the regions 400a and 400d (with the spectral peak of regions 400a and 400d being present at a and d); at (C), the aperture 402 captures a spectrum of the regions 400a, 400b, and 400c (with the corresponding spectral peaks being present at a, b, and c); at (D), the aperture 402 captures a spectrum of the regions 400b, 400c, and 400d (with the corresponding spectral peaks being present at b, c, and d); and at (E), the aperture 402 captures a spectrum of the region 400d (with the corresponding spectral peak being present at d). The processor 128 may then process these spectra using mathematical/statistical methods to reduce any overlap therebetween, thereby producing spectra which are each more representative of a respective portion of the specimen which corresponds to one of the image regions. For example, looking to (A), wherein the aperture encompasses only image region 400d, the spectrum can be assumed to correspond solely to the substance at the specimen region corresponding to image region 400d. Looking then to (B), wherein the aperture encompasses regions 400a and 400d, the contribution of region 400d can be subtracted to yield the spectrum of region 400a. This process of isolating the contributions of the different image regions can be continued for all of the collected spectra. Thus, the invention may index across the entirety of a region of interest on a specimen and may capture spectra at an array of locations, and the collected matrix of spectra may be used along with data extracted from the image of the region of interest to isolate the spectral contributions of discrete image regions. Alternatively, instead of indexing across the entire region of interest on a specimen, such indexing might be performed only at portions of the region of interest, e.g., at those portions at which the image region(s) are so small that the aperture cannot be set to encompass only a single image region. For example, in FIG. 2B, the aperture 208 is set about an image region 200a, but it also encompasses portions of an image region 200b, as well as a portion of the (matrix) image region 200d. The aperture 208 might therefore be indexed in a one-dimensional or two-dimensional array about the image region 200a, with spectra being captured at each image location, to allow the individual spectra of the image regions 200a, 200b, and 200d to be extracted.

Further advantages, features, and objects of the invention will be apparent from the remainder of this document in conjunction with the associated drawings.

DETAILED DESCRIPTION OF PREFERRED VERSIONS OF THE INVENTION

To review and expand on the discussion in the foregoing Summary, the images obtained by a spectroscopic microscope can be used to define the size and location of an aperture through which spectra are collected from a specimen, and the collected spectra can be linked to their corresponding image regions (identified as areas having the same or similar appearance during image analysis) to provide useful and easily understood output. Regions can be identified and spectrometrically sampled solely on the basis of their appearance, e.g., each specimen region corresponding to an identified image region may be spectrally analyzed. Alternatively or additionally, all or part of a region of interest on a specimen may be spectrometrically sampled, as by capturing spectra about a one- or two-dimensional matrix of sampled areas, and the correlations between the spectra in the matrix may be used in conjunction with specimen regions identified from the specimen image to assign extracted spectra to each specimen region. The automation of aperturing and data collection/analysis assists in avoiding the tedious measurement and analysis steps used in most prior spectroscopic microscopy systems, and greatly eases operation for novice users.

Figure 1:
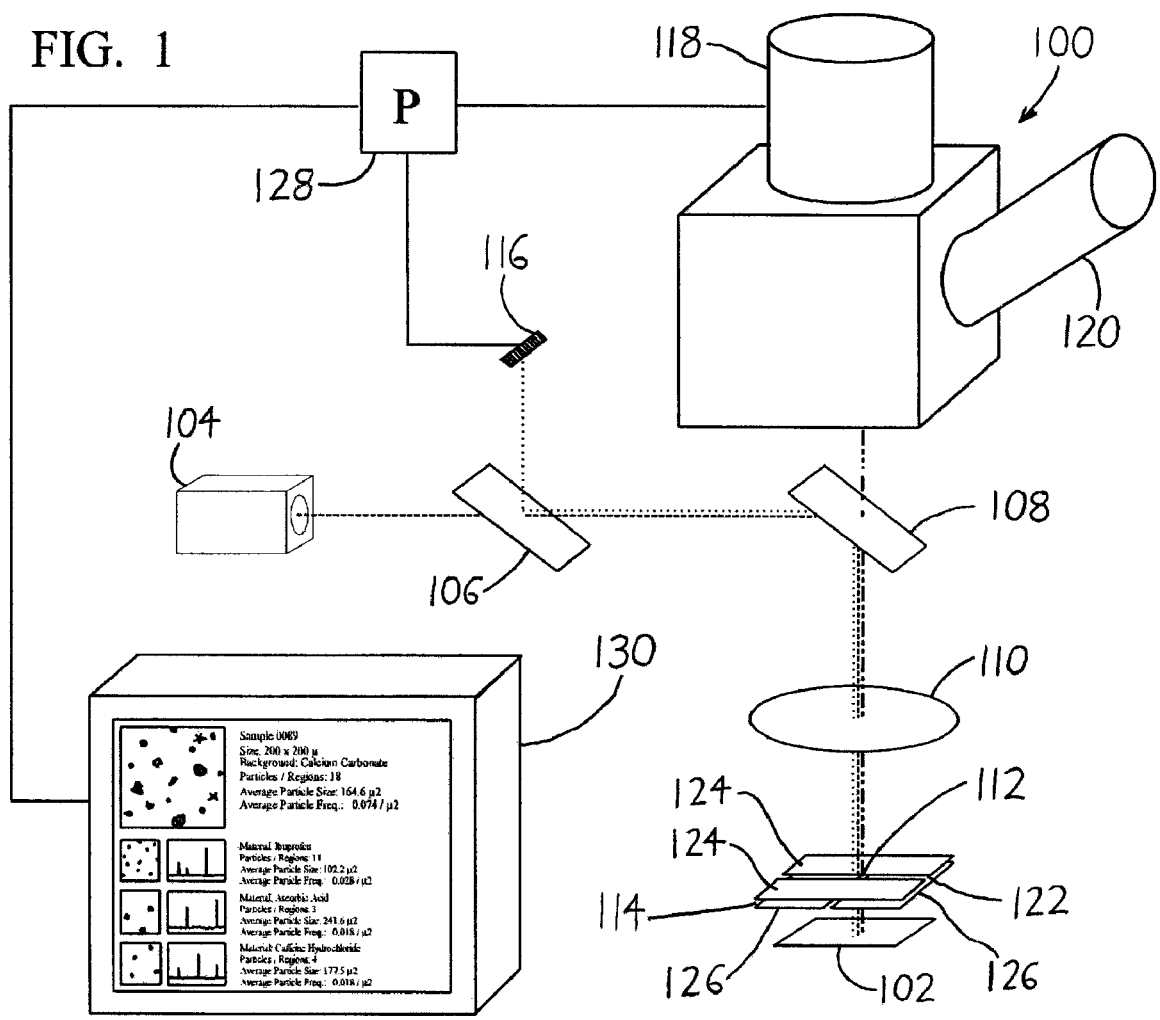
FIG. 1 is a schematic perspective view of a spectroscopic microscope 100 exemplifying concepts of the invention, wherein a camera 118 and/or eyepiece 120 present visual images of a specimen 102, while a detector 116 collects spectra from the specimen 102 through an aperture 112.

It is emphasized that the invention may be utilized with spectroscopic microscopes having components and arrangements far different from the one shown in FIG. 1. As an example, the spectroscopic microscope 100 is depicted using reflective-mode spectroscopy, wherein light from the light source 104 is directed to and reflected from the specimen 102 to be measured at detector 116. However, the invention is equally usable with transmissive-mode spectroscopy, e.g., where the specimen 102 is situated between a light source and the collection optics 110/108/106 so that the detector 116 receives light transmitted through, rather than scattered/reflected from, the specimen 102. Further, it should be understood that the type, number, and placement of the optics 110/108/106 (as well as the other components) may vary widely from the arrangement shown for the spectroscopic microscope 100.

Where the spectroscopic microscope 100 utilizes reflective-mode spectroscopy, it is useful for the specimen stage 102 to bear a mirror or other reflective portion (not shown) so that the reflective portion can be aligned with the incident light beam and deliver a "background" or reference signal back to the detector 116, i.e., a signal that represents the inherent background absorptance and/or reflectance of the spectroscopic microscope 100 with no specimen present. After or near the time a region spectrum is captured from a specimen region, the specimen stage 102 may be translated so that this reflective portion can be aligned with the incident light beam, and a background spectrum may be collected at the detector 116 with the same aperture size as that used for the specimen region. This background spectrum may be subtracted from the region spectrum to correct for the spectral contribution of the microscope 100. Where transmissive-mode spectroscopy is used, a transparent portion (e.g., a hole or void) could be provided in the specimen stage 102 for the same purposes.

If the aforementioned background spectra are collected and subtracted, it can be useful for the invention to determine the average size of similar image regions, and then collect region spectra from their corresponding specimen regions using an aperture set to their average size. Then, when it is desired to collect a background spectrum for these specimen regions, the aperture may again be set to the average specimen region size and only a single background spectrum need be collected for subtraction from the region spectra.

In the foregoing discussion, it was noted that the aperture stage 114, as well as the specimen stage 102, might be translatable and also rotatable. While this arrangement is versatile, it is usually sufficient to simply provide a translatable specimen stage 102 so that the specimen may be translated in any direction along a plane perpendicular to the incident light beam, and have the aperture stage 114 be rotatable about the incident beam, with its aperture 112 being centered about the incident beam and being variably resizable. The aperture 112 need not be a rectangular aperture, and could instead be a circular aperture (as provided by an irising shutter) or an aperture having some other polygonal shape. As an example, if two additional pairs of masking plates are added, with these masking plates opening along axes oriented at forty-five degrees from those shown, an octagonal aperture can be formed. The ability to respace each pair of masking plates independently from the other pairs, and the ability to asymmetrically displace the masking plates in each pair (i.e., the plates in the pair can each be displaced from the center of the aperture by a different amount), allows the aperture to very closely fit a wide variety of specimen regions.

The processor 128, as well as the display 130 on which the output is shown to the user, are contemplated as taking the form of a personal computer (with an associated monitor) which is connected in communication with the spectroscopic microscope 100. However, the processor 128 and display 130 may take other forms, such as a dedicated processor and display screen provided as a unit with the microscope 100. The processor 128 and display 130 need not be provided in proximity with the microscope 100, and could (for example) be provided in a remote location with information exchange between the processor 128 and display 130 occurring via wired or wireless telecommunications (e.g., via the Internet or other client-server communications).

Figure 4:
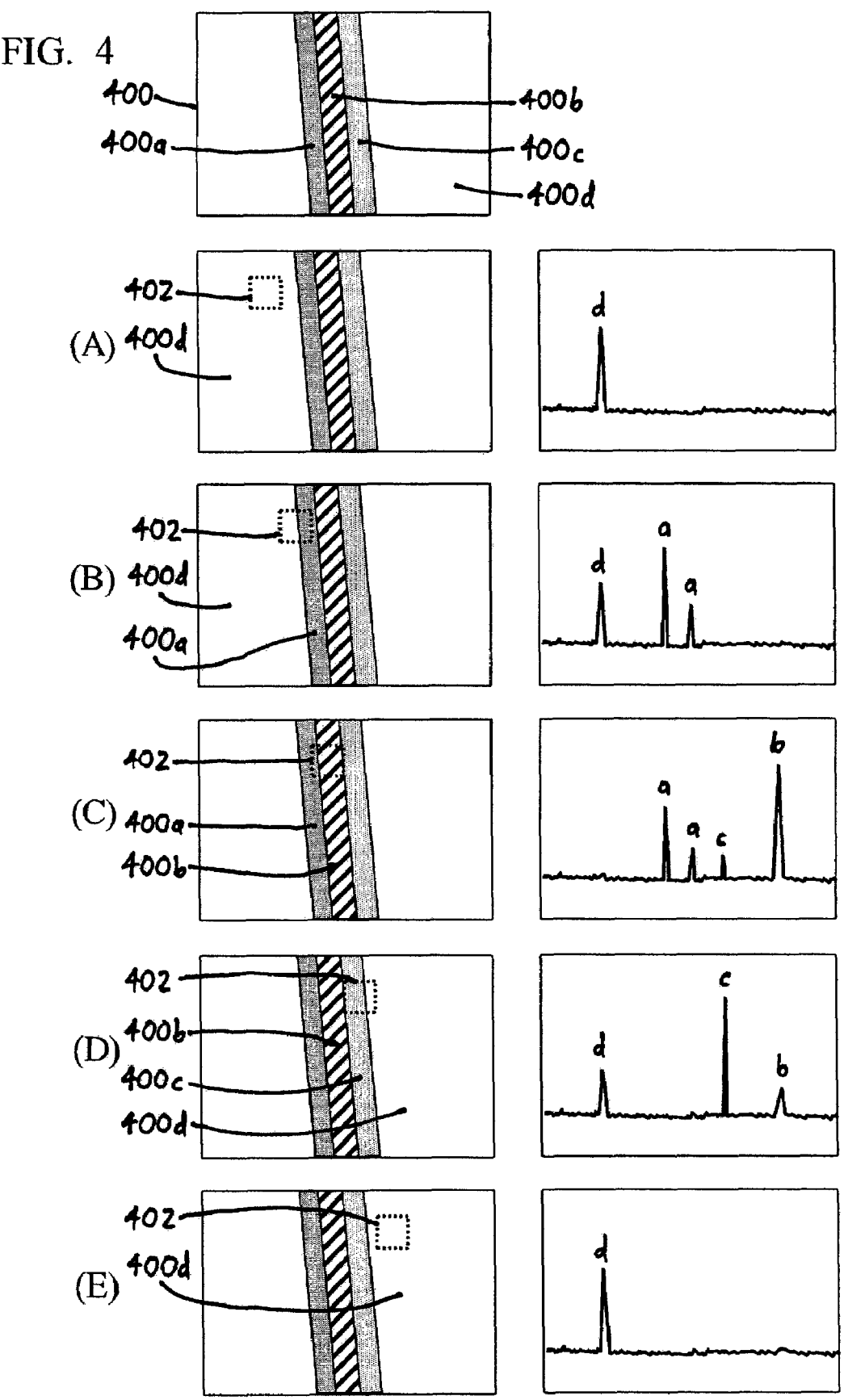
FIG. 4 illustrates an exemplary specimen image 400 along with an aperture 402 being indexed across corresponding locations on the specimen, and with spectra collected at each such aperture location.

The video camera 118 may take the form of any imaging system capable of generating a pixillated image of the specimen 104. The video camera 118 need not image the specimen 104 in the visible spectrum (or solely in the visible spectrum), and it could capture images of the spectrum in the ultraviolet and/or infrared ranges as well as (or instead of) in the visible range to potentially assist in better identifying discrete image regions. The use of images captured from the specimen 104 by use of polarized incident light is also possible. It should be understood that multiple images of the specimen 104 may be obtained from the specimen using different types of light, and the discrete specimen regions identified from each of these specimen images may then be combined to provide a final specimen image having (possibly) a greater number of image regions, each representing a specimen region with (possibly) different substances or other properties. For example, when a specimen is imaged using visible light, it may yield some number of image regions having discrete contrasts, but when the specimen is then imaged using ultraviolet or polarized light, some of these image regions may merge, and others may subdivide into additional image regions. It is also possible that an entirely different set of image regions may appear. In these instances, if spectra are collected from the various specimen regions which correspond to the various image regions appearing under the different forms of light, any spectra gathered from overlapping (but nonidentical) specimen regions may be mathematically/statistically analyzed as described above (e.g., in relation to FIG. 4) to better isolate the spectra of discrete substances present in the specimen regions. Additionally or alternatively, where different image regions appear under different forms of incident light, the boundaries of the image regions may be overlaid to generate a final "combined map" of image regions, and spectra may be collected from the resulting image regions.

Figure 2A:
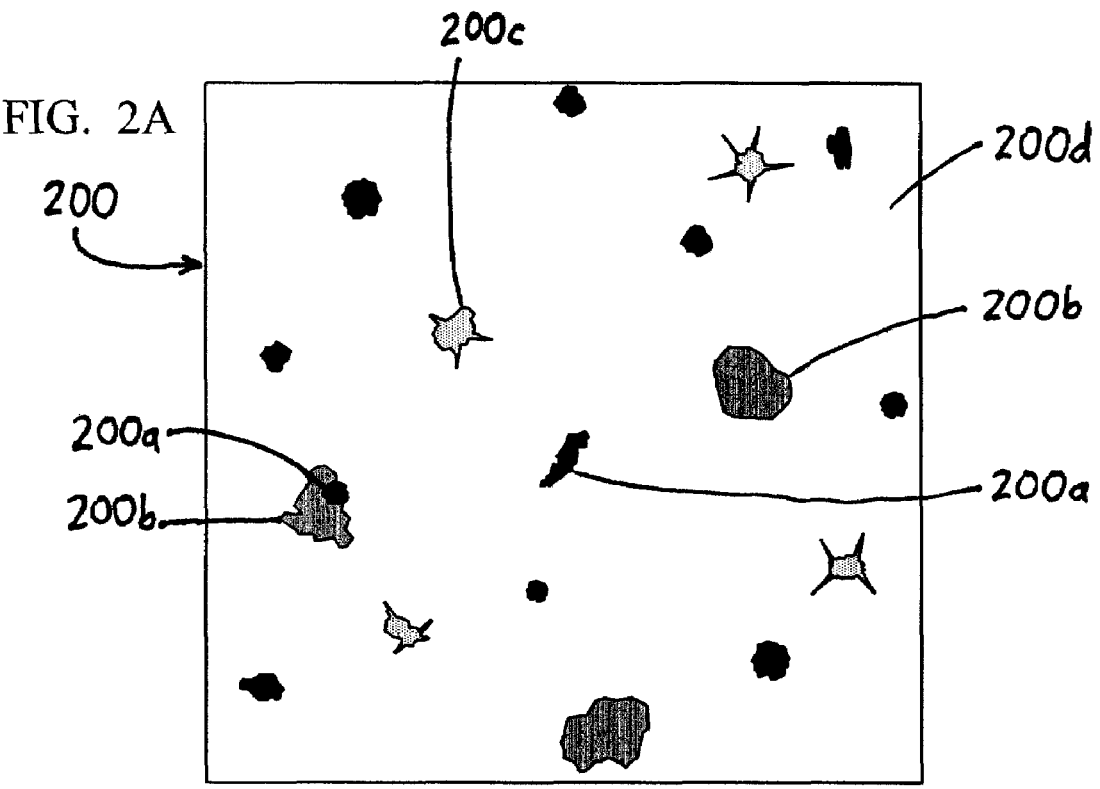
FIG. 2A is an exemplary specimen image 200 (an image of a region of interest on a specimen) depicting several image regions 200a, 200b, 200c, and 200d defined by contrast analysis of the specimen image 200.

As previously noted, image regions are identified as areas having the same or similar contrast within the specimen image (which will generally be in color, rather than in the greyscale used to represent the image regions in this document). "Contrast" should be understood to encompass differences in any one or more of hue (color), saturation (color mixture), value (brightness), and similar visual qualities. Thus, for example, after the camera 118 obtains a specimen image (as in FIG. 2A), the processor 128 might automatically define sets of image regions depending on where groups of adjacent pixels in the specimen image rest in one or more of the hue, saturation, value, and/or other dimensions which define contrast. This is preferably done by performing cluster analysis on the pixels, i.e., by identifying pixels which are closely adjacent when mapped in the aforementioned contrast dimensions. To illustrate, the pixels in a specimen region may be mapped in the hue, saturation, and value dimensions (as well as in their X/Y pixel location dimensions), and those adjacent pixels which are clustered in a particular region of the map can be regarded as belonging to the same image region. Where multiple specimen images are collected, e.g., images of the same specimen taken under visible, polarized, ultraviolet, etc. light, the contrast values from the various specimen images may be treated as additional dimensions. Alternatively, rather than performing cluster analysis, image regions might be more simply defined as all pixels which fit within certain discrete ranges or "bins" of values in the various contrast dimensions, as by defining an image region as all pixels which rest within a hue range X1-X2, a saturation range of Y1-Y2, and a value range of Z1-Z2. In this case, adjacent bins might be merged to define a single image region if they both contain large numbers of pixels.

Figure 2B:
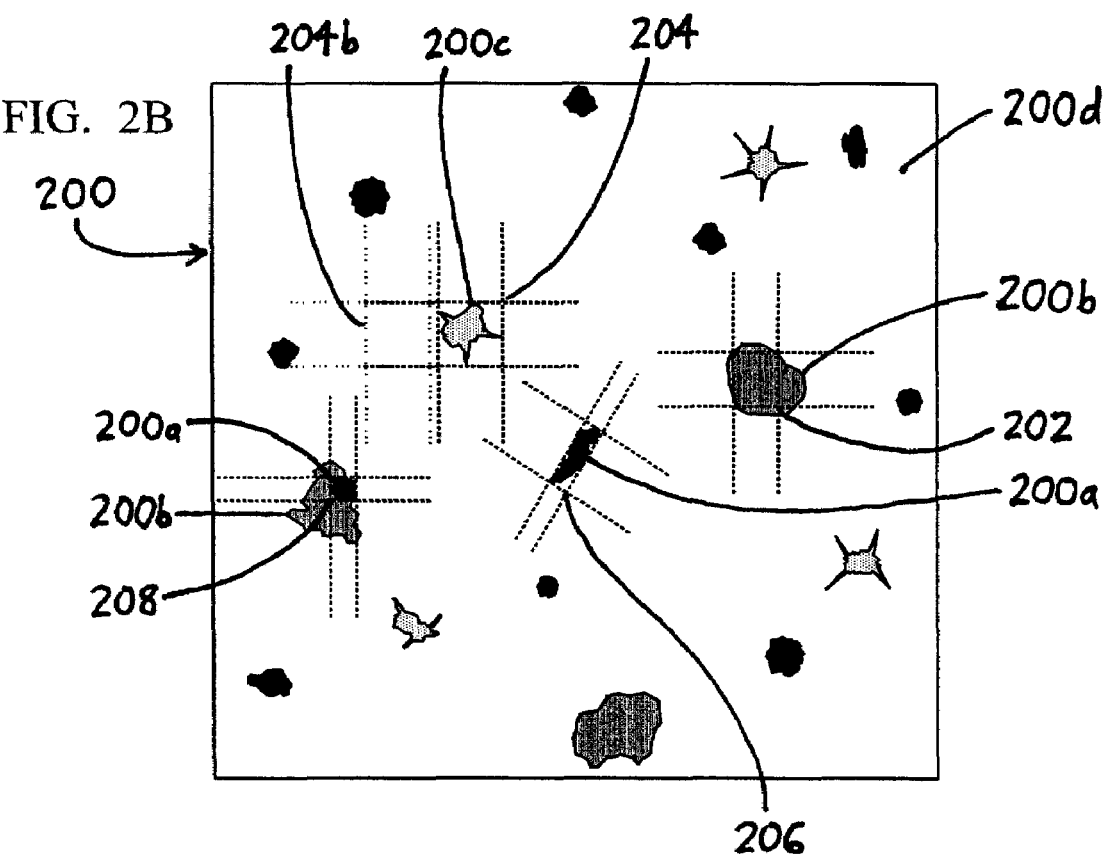
FIG. 2B presents the specimen image 200 of FIG. 2A with exemplary apertures 202, 204, 206, etc. that might be defined within or about the image regions 200a, 200b and 200c.

Once image regions are automatically identified by the processor 128 via analysis of the specimen image, the identified image regions might then be presented to the user of the invention (as by displaying the specimen image with colored borders inserted to outline the image regions) so that the user may accept, reject, or modify them. For example, the user might be able to move a cursor over the specimen image and select one or more image regions—e.g., image regions 200a and 200b near the left-hand side of FIG. 2B—and "merge" them so that they are thereafter treated as a single image region. This can be particularly useful where a region of a specimen (and thus the corresponding image region) has voids/holes, in that the user can select the voids/holes (which generally appear as separate image regions) and merge them with the surrounding region(s). As another example, the user might be able to move a cursor over the specimen image and "lasso" or "box" chosen areas, and all portions of the specimen image having the same or similar contrast as the chosen area might be selected as an image region.

Prior to the identification of image regions, it can also be useful to apply image filters to remove noise and irregularities from the specimen image, and thereby assist in more accurate identification of discrete image regions (and image regions having the same or similar contrast). As an example, isolated pixels (or small sets of pixels) having contrasts markedly dissimilar from their surroundings might be regarded as noise, and can have their contrast values reset to those of their surroundings or can otherwise be grouped into their surrounding image regions. To illustrate, if the foregoing cluster analysis is performed to identify image regions, those pixels which are "outliers" (i.e., which do not seem to fit within any cluster of pixels having similar contrast values) can simply be reassigned with contrast values approximating those of the adjacent pixels in the specimen image.

It was previously noted that where a specimen region cannot be apertured for spectral capture without also including an adjacent second specimen region within the aperture, it is useful to also aperture the second specimen region, capture its region spectrum, and subtract it from the region spectrum obtained from the first and second specimen regions to obtain a corrected region spectrum for the first specimen region. For certain types of specimens, it can be useful to obtain a corrected region spectrum even if it seems that the aperture can be set to read only a single specimen region. Consider, for example, if the image of FIG. 2A was obtained from a thin film wherein the image regions represent occlusions within the film matrix (represented by image region 200d). Then consider specimen region 200b near the right-hand side of FIG. 2B. Here, even though the aperture 202 can be set to fit entirely within the specimen region corresponding to image region 200b, since the specimen region is an occlusion, any region spectra collected therefrom will include contributions from the film matrix 200d (which rests over the occlusion 200b). Thus, by collecting a matrix spectrum from the film matrix 200d and subtracting it from the region spectrum collected for the occlusion 200b, one may obtain a corrected region spectrum which more accurately represents the substance(s) within the occlusion 200b alone.

Also, when subtracting a matrix spectrum from a region spectrum, or more generally when subtracting the spectrum of any region from the spectrum of another region, it may be useful if the spectrum being subtracted is one generated by averaging several spectra which have been checked for uniformity. As an example, referring to FIG. 2B, it was previously noted that the matrix spectrum collected from aperture 204b could be subtracted from the region spectrum collected from aperture 204 to obtain a corrected region spectrum which more accurately represents the image region 200c. However, rather than simply subtracting the matrix spectrum collected from aperture 204b, it may be useful to capture several matrix spectra—for example, in various areas about the image region 200c—and check their variance to ensure that they have relatively consistent composition. This effectively checks to see whether image analysis failed to identify a nearby discrete image region having different composition, perhaps because the image region did not exhibit sufficient contrast to be identified from the image. If variance is close to zero, the several matrix spectra can be averaged, and then can be subtracted from the region spectrum collected from aperture 204. This methodology can help produce more reliable results.

As previously noted, once the image regions are identified, the processor 128 can index the specimen stage 102 beneath the aperture stage 114 to successively align the aperture 112 with each specimen region corresponding to an image region (or to only some of these specimen regions), adjust the size of the aperture 112 appropriately, and capture their region spectra. This indexing can be performed automatically by (for example) ranking each image region by its lowest X coordinate in the specimen image, and secondarily by its lowest Y coordinate. The specimen stage 102 can then scan across the X/Y values to collect a region spectrum from each specimen region. Where appropriate, the processor 128 can execute a subroutine to collect spectra for subtraction (e.g., background spectra and/or the spectra of adjacent matrix or other regions), or for use in the extractive method discussed previously in relation to FIG. 4. As also previously noted, the microscope 100 need not collect spectra from each individual specimen region, and it might (for example) collect a region spectrum from only one of the specimen regions corresponding to image regions 200b, and assume that the same region spectrum applies to all specimen regions of the same type/class. It is also possible that the microscope 100 need not automatically index between specimen regions to collect their region spectra, and instead it might collect region spectra from only those specimen regions selected by the user (as by placing a cursor over and "clicking on" the image regions in the specimen image 200 for which the user seeks region spectra).

As discussed above with reference to FIG. 4, the invention can alternatively or additionally analyze specimens by collecting spectra at adjacent (or overlapping) locations on the specimen, and then mathematically/statistically extracting the spectra of pure substances from the collected spectra. Such extraction can be expedited with reference to the spectral collection locations relative to the location of image regions, but if desired, spectral extraction can be performed without any reference to image information. This can be useful, for example, where the specimen image does not display sufficient contrast that distinct image regions appear. In this case, spectra may be collected from a grid of locations across the specimen, pure substance spectra can be mathematically/statistically extracted, and an artificial specimen image (as well as substance images and the like) can then be constructed with each pixel being color-coded in accordance with the substance(s) detected at that pixel. It is notable that if this process is performed, spectral extraction can often be more accurately performed with a dense sampling grid (preferably with oversampling, i.e., with spectra being collected from overlapping areas) rather than a sparse grid (e.g., one where the spectrally-sampled areas are spaced distantly apart).

Figure 3:
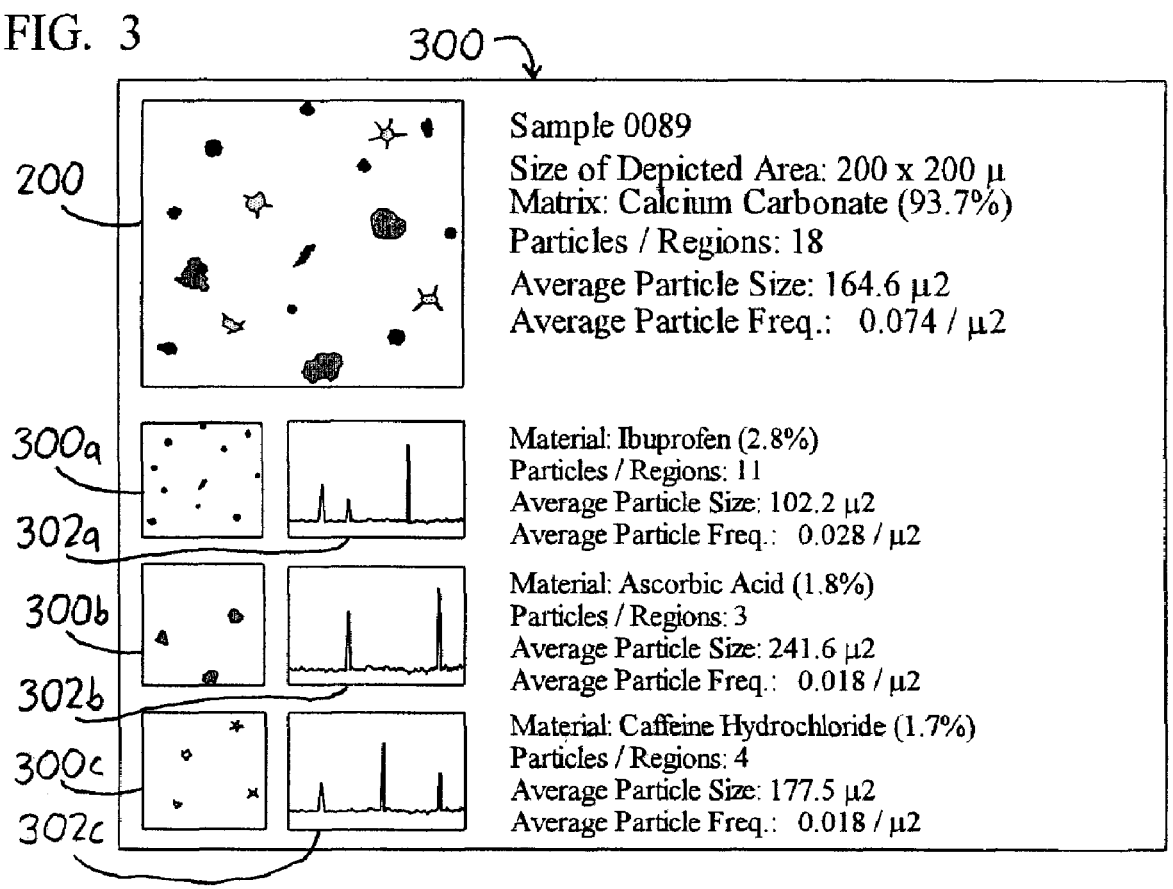
FIG. 3 illustrates an exemplary output display that might be generated from spectral and image analysis of a region of interest on a specimen.

The type and format of the output shown in FIG. 3 is merely exemplary, and output may have vastly different content and appearance. However, FIG. 3 illustrates, in simple form, preferred elements of the output. The specimen image is provided along with a user-assigned identifier for the specimen, such as a serial number or the like, and the size of the specimen image (i.e., the size of the imaged area of the specimen). The spectrally-determined identity of each of the substances present in the specimen regions is also provided, along with its relative percentage over the specimen image, its substance image (i.e., the specimen image processed to subtract all regions of the specimen save for the ones including the substance in question), and the spectrum used to determine the identity. (The spectrum for the matrix—which will generally be the image region having the greatest pixel count over the specimen image, and/or the image region having the most intersections with a grid overlaid on the specimen image—is not shown in FIG. 3, though it might be included as well.) The spectra used to identify the substance(s) within a specimen region may be averaged spectra, for example, the "Ibuprofen" spectrum shown in FIG. 3 may be the average of several spectra collected over the specimen regions depicted in the substance image shown to the left of the spectrum. Counts of all image regions, and of specific types of image regions (i.e., for each of "Ibuprofen," "Ascorbic Acid," etc.), are also provided along with their average size and frequency. Other parameters and metrics could also or alternatively be displayed, such as the aspect ratio of image regions (i.e., the ratio of size in the longest dimension to size in a perpendicular dimension), the variance in size of a particular type/class of specimen region, the chemical formulae of substances as well as their common name, etc. The foregoing information can be provided in textual form or in graphical form, e.g., in plots and/or diagrams, and text can be overlaid on graphics (e.g., the names of substances might be directly overlaid on the specimen image).

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:

1. A spectroscopic microscope including:
 a. a specimen stage bearing a specimen;
 b. a light source situated to supply light to the specimen;
 c. a detector situated to receive light from the specimen;
 d. a video camera capturing an image of the specimen;
 e. a movable aperture stage interposed between the detector and the specimen stage, the aperture stage having an aperture of adjustable size therein;
 f. a processor:
  (1) receiving the image of the specimen, the image being formed of a set of pixels;
  (2) isolating sets of adjacent pixels within the image wherein the pixels have similar contrast, with each such set defining an image region;
  (3) moving the aperture stage to align the aperture:
   (a) between the specimen and the detector, and
   (b) to a portion of the specimen corresponding to one of the image regions, with this portion of the specimen defining a specimen region;
  (4) obtaining a region spectrum of the specimen region through the aperture;
  (5) identifying one or more substances from the region spectrum;
 g. a display showing:
  (1) the image of the specimen, and
  (2) an output of the identified substances.

2. The spectroscopic microscope of claim 1 wherein:
 a. the aperture is adjustably sizable in two dimensions, with the size in each dimension being independently adjustable, and
 b. the processor adjusts the aperture size to at least substantially correspond with the size of the specimen region.

3. The spectroscopic microscope of claim 2 wherein:
   a. the aperture is rotatable, and
   b. the processor rotates the aperture to align with the specimen region such that:
      (1) minimal area of the specimen region is outside the aperture, or
      (2) minimal area of the specimen outside the specimen region is within the aperture.

4. The spectroscopic microscope of claim 1 wherein the processor also:
   a. moves the aperture stage to align the aperture:
      (a) between the detector and the specimen, and
      (b) to a portion of the specimen adjacent to the specimen region, this portion of the specimen defining a matrix region;
   b. obtains a matrix spectrum of the matrix region through the aperture; and
   c. identifies one or more substances from the region spectrum and the matrix spectrum.

5. The spectroscopic microscope of claim 4 wherein the size of the aperture is the same when obtaining the region spectrum and the matrix spectrum.

6. The spectroscopic microscope of claim 1 wherein the processor, after obtaining a region spectrum of the specimen region through the aperture:
   a. moves the aperture stage to align the aperture:
      (1) between the specimen and the detector, and
      (2) to a portion of the specimen corresponding to a second one of the image regions, with this portion of the specimen defining a second specimen region;
   b. obtains a second region spectrum of the second specimen region through the aperture; and
   c. identifies one or more substances from the second region spectrum.

7. The spectroscopic microscope of claim 6 wherein the processor, prior to obtaining each region spectrum, adjusts the aperture size to at least substantially conform to the size of the corresponding specimen region.

8. A spectroscopic microscopy method including the steps of:
   a. obtaining an image of a specimen, the image being formed of a set of pixels;
   b. using a processor to perform the following:
      (1) isolating sets of adjacent pixels within the image wherein the pixels have similar contrast, with each such set defining an image region, and
      (2) generating instructions for aligning an aperture to a portion of the specimen corresponding to one of the image regions, with this portion of the specimen defining a specimen region;
   c. aligning an aperture to the specimen region in accordance with the instructions;
   d. supplying incident light to the specimen;
   e. detecting light from the specimen region through the aperture, the light defining a region spectrum;
   f. identifying one or more substances from the region spectrum;
   g. displaying:
      (1) the image of the specimen, and
      (2) an output of the identified substances.

9. The spectroscopic microscopy method of claim 8 further including the step of adjusting the size of the aperture to at least substantially correspond to the size of the specimen region in accordance with instructions from the processor.

10. The spectroscopic microscopy method of claim 9 further including the step of adjusting the size of the aperture such that the boundaries of the aperture rest entirely within the specimen region, whereby the region spectrum is defined solely by the specimen region.

11. The spectroscopic microscopy method of claim 9 further including the step of adjusting the size of the aperture:
   a. to maximize the area of the specimen region within the boundaries of the aperture,
   b. while minimizing the area outside of the specimen region within the boundaries of the aperture.

12. The spectroscopic microscopy method of claim 8:
   a. wherein the aperture includes within its boundaries portions of the specimen corresponding to two or more of the image regions,
   b. further including the steps of:
      (1) indexing the aperture to different locations across the portions of the specimen corresponding to the image regions,
      (2) collecting a spectrum from each location;
      (3) processing the collected spectra to reduce any overlap therebetween, thereby producing spectra which are each more representative of a respective portion of the specimen corresponding to one of the image regions.

13. The spectroscopic microscopy method of claim 8 further including the step of rotating the aperture to minimize at least one of:
   a. any area of the specimen region located outside the aperture, and
   b. any area outside the specimen region located within the aperture, in accordance with instructions from the processor.

14. The spectroscopic microscopy method of claim 8 further including the steps of:
   a. aligning the aperture to a portion of the specimen adjacent to the specimen region, this portion of the specimen defining a matrix region;
   b. obtaining a matrix spectrum of the matrix region through the aperture; and
   c. removing the matrix spectrum from the region spectrum prior to identifying one or more substances from the region spectrum.

15. The method of claim 14 wherein the step of aligning the aperture to the matrix region occurs in accordance with instructions generated within the processor.

16. The spectroscopic microscope of claim 14 wherein the size of the aperture is the same when obtaining the region spectrum and the matrix spectrum.

17. The spectroscopic microscopy method of claim 8 further comprising:
   a. generating within the processor instructions for aligning the aperture to a second portion of the specimen corresponding to a second one of the image regions, with this second portion of the specimen defining a second specimen region;
   b. aligning the aperture to the second specimen region in accordance with the instructions;
   c. detecting light from the second specimen region through the aperture, the light defining a second region spectrum;
   d. identifying one or more substances from the second region spectrum; and
   e. displaying an output of the substances identified from the region spectra.

18. The spectroscopic microscopy method of claim 17 wherein, prior to detecting light from each of the specimen regions to define the region spectra, at least one of:
   a. the size of the aperture is adjusted to at least substantially correspond to the size of the specimen region, and b. the orientation of the aperture is adjusted to at least substantially correspond to the orientation of the specimen region.

19. The spectroscopic microscopy method of claim 17 wherein the display of the output of the substances identified from the region spectra includes one or more of:
   a. two or more substance images, wherein each substance image depicts those portions of the image of the specimen which correspond to an identified substance;
   b. estimated quantities of each identified substance present in the image, with each estimated quantity being at least partially defined by the number of pixels in the image having a contrast which at least approximates the contrast of the pixels corresponding to one of the identified substances;
   c. for one or more of the identified substances, the number of specimen regions containing the identified substance; and
   d. the size of one or more of the specimen regions.

20. A spectroscopic microscopy method including the steps of:
   a. obtaining an image of a specimen, the image being formed of a set of pixels; using a processor to perform the following:
   b. isolating sets of adjacent pixels within the image wherein the pixels have similar contrast, with each such set defining an image region;
   c. for each of two or more of the image regions:
      (1) aligning an aperture to a portion of the specimen corresponding to the image region, with this portion of the specimen defining a specimen region;
      (2) obtaining a region spectrum of the specimen region through the aperture;
      (3) aligning the aperture to a portion of the specimen adjacent to the specimen region, with this portion of the specimen defining a matrix region;
      (4) obtaining a matrix spectrum of the matrix region through the aperture;
      (5) subtracting the matrix spectrum from the region spectrum, thereby obtaining a corrected region spectrum;
      (6) identifying one or more substances corresponding to the corrected region spectrum;
   d. displaying an output of the identified substances.

21. The spectroscopic microscopy method of claim 20 wherein for each image region:
   a. the aperture is sized and rotated to:
      (1) maximize the area of the specimen region within the aperture,
      (2) while minimizing the area outside of the specimen region within the aperture; and
   b. the aperture size is the same when obtaining the region spectrum and the matrix spectrum.

22. The spectroscopic microscopy method of claim 20 wherein the step of displaying an output of the identified substances includes generating two or more substance images wherein each substance image depicts those portions of the image of the specimen which correspond to an identified substance.

* * * * *